March 15, 1938. W. H. SICKINGER 2,111,056
ELECTRIC COOKING UTENSIL
Filed May 17, 1937
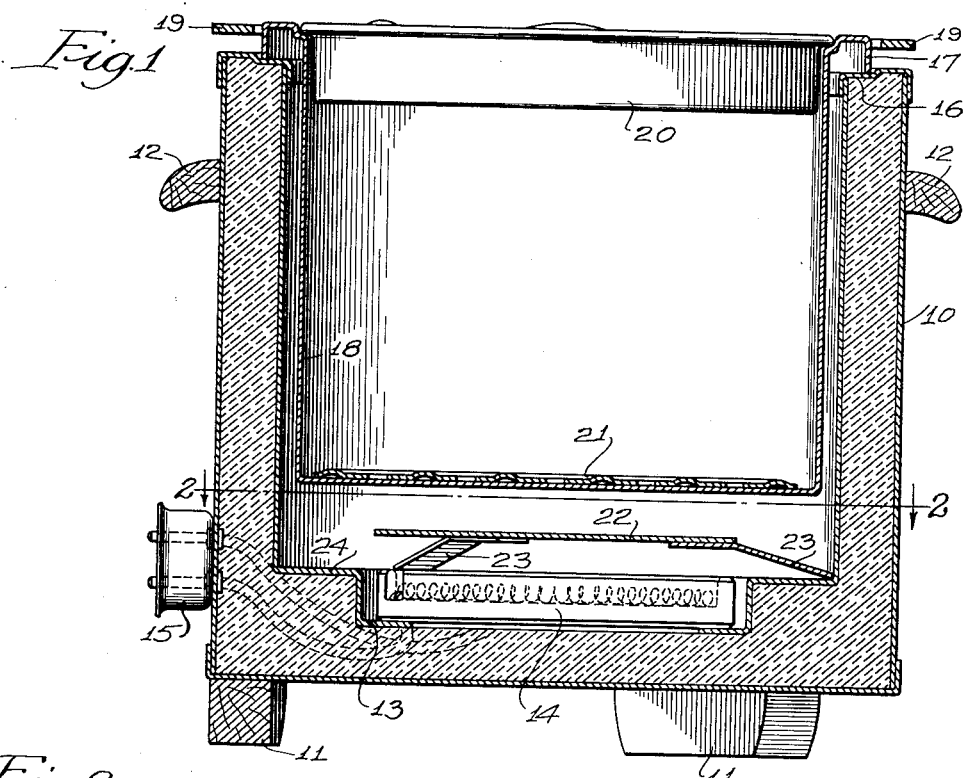
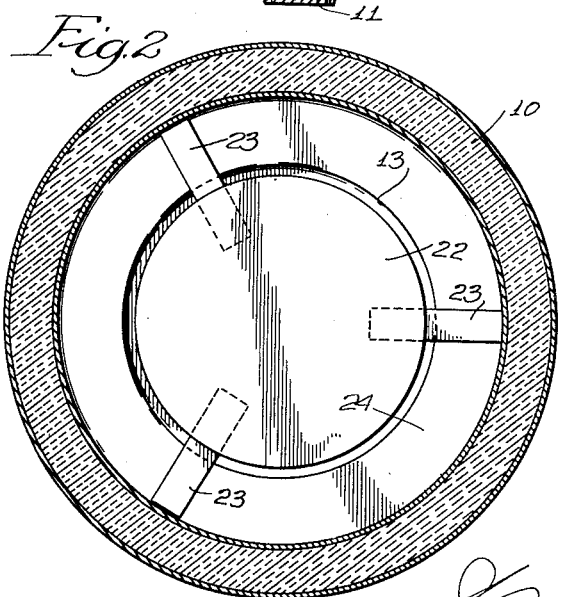
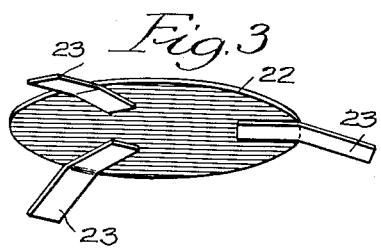

Patented Mar. 15, 1938

2,111,056

UNITED STATES PATENT OFFICE 2,111,056

ELECTRIC COOKING UTENSIL

William H. Sickinger, Chicago, Ill., assignor to Crown Stove Works, Cicero, Ill., a corporation of Illinois Application May 17, 1937, Serial No. 143,007

2 Claims. (Cl. 219—43)

This invention relates to improvements in electric cooking utensils. A known type of such utensil consists of a bucket-like body or container, an electric heating unit mounted on the bottom wall of the container, and a removable cooking vessel supported within the container with its bottom wall slightly above the top of the heating unit. It has been found in practical use of such cooking utensils that the radiant heat from the heating unit impinging directly upon the bottom of the cooking vessel, which latter is usually of aluminum, warps the bottom. Furthermore, when cooking a non-liquid food, such as meat, the non-uniform application of the heat not infrequently burns or scorches the food being cooked.

The object of the invention is to provide an improvement in this type of cooker which will successfully eliminate the above noted faults.

A simple and practical embodiment of the invention is illustrated in accompanying drawing, in which,—

Fig. 1 is a vertical axial section of the complete outfit;

Fig. 2 is a horizontal section on the line 2—2 of Fig. 1, and

Fig. 3 is a perspective view of the baffle plate.

Referring to the drawing, 10 designates as an entirety the body member or container of the cooker which, as usual, in this type of cooker is formed with thick, heavily insulated side and bottom walls. The container is equipped with short supporting legs 11 and with handles 12 at diametrically opposite points of its side wall. The bottom wall of the container is formed with a countersink 13, in which is mounted an electric heating unit 14 substantially filling the countersink. The heating unit is wired in any suitable manner to an external socket 15 on its side wall.

On the top edge of the container 10 is a shallow countersink 16 on which rests an annular flange 17 of the cooking vessel 18, the latter depending into the container to approximately the relative extent shown in Fig. 1. The cooking vessel 18 is equipped with handles 19 and with a removable cover 20.

21 designates a known apertured, corrugated disk that removably rests on the bottom wall of the vessel 18 and is designed to prevent burning or scorching of the article being cooked, and to a slight extent does accomplish this result. The efficiency of this disk for its intended purpose, however, it low and, furthermore, since it does not shield the bottom wall of the cooking vessel from the direct intense heat of the heater 14, it is valueless to prevent warping of the cooking vessel.

In accordance with the present invention, I provide a flat, solid, imperforate baffle plate 22, that is of substantially the same form and area as the heating unit 14, and is equipped with a plurality of outwardly splayed legs 23 welded or otherwise secured to the lower side of the plate 22, which legs 23 rest on the annular ledge 24 of the bottom wall that surrounds the countersink 13 and supports the plate 22 substantially midway between the burner 14 and the bottom of the cooking vessel 18. To maintain the baffle plate 22 against lateral shifting, the legs 23 are preferably made long enough to extend to the lower corner formed by the side and bottom walls of the container 10, as shown in Fig. 2.

From the foregoing it will be apparent that the baffle plate 22 both shields the bottom of the cooking vessel from the direct radiant heat of the burner 14 and also sends most of the heated air up into the annular space between the side walls of the container 10 and the vessel 18, thus more uniformly distributing the heat and consequently more uniformly cooking the food in the vessel.

I claim:

1. In an electric cooking utensil of the class described, the combination of an open-top container having its bottom wall formed with a central countersink, an electric heating unit occupying said countersink, a cooking vessel suspended in the chamber of said container out of contact with the side walls of the latter and with its bottom wall vertically spaced from said heating unit, and a removable imperforate baffle plate in said container located approximately midway between the top of said heating unit and the bottom wall of said cooking vessel, said baffle plate being of substantially the same outline form and area as said heating unit, and supporting legs on said baffle plate stepped on but unattached to the ledge of said container bottom wall surrounding said countersink.

2. In an electric cooking utensil of the class described, the combination of an open top container having its bottom wall formed with a central countersink, an electric heating unit occupying said countersink, a cooking vessel suspended in the vessel of said chamber out of contact with the side walls of the latter and with its bottom wall vertically spaced from said heating unit, and a removable imperforate baffle plate in said container located approximately midway between the top of said heating unit and the bottom wall of said cooking vessel, and outwardly and downwardly inclined supporting legs on said baffle plate stepped on but unattached to the ledge of said container bottom wall and extending into contact with the interior side wall of said container, whereby edgewise displacement of said baffle plate relatively to said heating unit is prevented.

WILLIAM H. SICKINGER.